United States Patent [19]

Doi et al.

[11] Patent Number: 4,538,341
[45] Date of Patent: Sep. 3, 1985

[54] MACHINE TOOL WITH TOOL CHANGE FUNCTION

[75] Inventors: Yoshio Doi, Kariya; Tetsuro Yamakage; Kunimichi Nakashima, both of Anjoh; Akihiro Matsuura, Chiryu, all of Japan

[73] Assignee: Toyoda Koki Kabushiki Kaisha, Kariya, Japan

[21] Appl. No.: 477,990

[22] Filed: Mar. 22, 1983

[30] Foreign Application Priority Data

Mar. 29, 1982 [JP] Japan ................................. 57-49040

[51] Int. Cl.³ ............................................. B23Q 3/157
[52] U.S. Cl. ...................................... 29/568; 409/144; 409/215; 409/230
[58] Field of Search ............... 29/568, 26 A, 426.3; 414/736; 409/144, 201, 209, 215, 217, 230

[56] References Cited

U.S. PATENT DOCUMENTS

Re. 31,288  6/1983  Matsuzaki et al. ............... 29/568 X
3,256,600   6/1966  Swanson et al. ................. 29/568
3,930,301   1/1976  Wagner ......................... 29/568

FOREIGN PATENT DOCUMENTS 2209031  10/1972  Fed. Rep. of Germany ........ 29/568
51-38109 10/1976  Japan .......................... 29/568
55-15683 11/1980  Japan .......................... 29/568
2073626A 10/1981  United Kingdom ................ 29/568

Primary Examiner—Z. R. Bilinsky

Attorney, Agent, or Firm—Oblon, Fisher, Spivak, McClelland & Maier

[57] ABSTRACT

A machine tool having an automatic tool changer for transferring tools between a tool magazine and a horizontal tool spindle rotatably mounted in a spindle head and which includes a vertical head which rotatably carries a vertical tool spindle and a horizontal drive shaft connected thereto is removably mounted on a vertical head support. In advance of a machining operation on a top surface of a workpiece, relative movement between the vertical head support and the spindle head is effected in a vertical direction and first and second horizontal directions, so that the vertical head is mounted on the spindle head, with the drive shaft being drivingly connected with the horizontal tool spindle. A tool support station mounted on the vertical head support is provided with two tool grippers each for vertically holding a tool. The tool support station is brought under the vertical head being mounted on the spindle head and selectively presents the two tool grippers in vertical axial alignment with the vertical tool spindle. In this state, the spindle head is moved in the vertical direction and the axial direction of the horizontal tool spindle and enables the vertical tool spindle to return a used tool therefrom to one of the tool grippers and then, to receive therein a new tool from the other tool gripper. A tool transfer device, which cooperates with the tool changer to receive a new tool therefrom and hand over a used tool thereto, is provided between the tool changer and the tool support station and transfers tools therebetween.

10 Claims, 10 Drawing Figures

MACHINE TOOL WITH TOOL CHANGE FUNCTION

BACKGROUND OF THE INVENTION

1. Field of the Invention:

The present invention relates to a machine tool, and more particularly to a horizontal machining center.

2. Description of the Prior Art:

Horizontal machining centers having a horizontal tool spindle include a work table with a rotary table mounted thereon. Once a workpiece is clamped on the rotary table, four sides of the workpiece can be machined by indexing the rotary table, with the abutment side and upper side of the workpiece being not machinable. The upper side of the workpiece, however, can be rendered machinable by a vertical head fixed to the distal end of the spindle head. The conventional vertical head requires that tools for use only on the vertical head be prepared since tools used on the horizontal tool spindle cannot be automatically changed with respect to the vertical head. The vertical spindle is therefore poor in its versatility as it is limited to certain machining operations. No tools can be shared by the vertical and horizontal tool spindles.

One known type of machining center capable of machining five sides of a workpiece has a vertical spindle and a horizontal spindle both mounted on a spindle head, and also has a tool changer which is particularly designed for changing tools on the vertical and horizontal tool spindles. In another known machining center, a tool spindle is supported on a spindle head for horizontal and vertical tilt movement, and tools can be changed on the spindle when the same is placed in a horizontal position. These constructions demand redesign of the entire arrangements of machine, tool changer, and other related mechanisms. It has therefore been impossible to give the above functions to existing machine tools.

SUMMARY OF THE INVENTION

It is an object of the present invention to provide a horizontal machining center in which machining operations can be performed on five sides of a workpiece which include an upper side thereof.

Another object of the present invention is to achieve the above object through a minimum modification in existing horizontal machining centers capable of machining four sides of a workpiece.

Still another object of the present invention is to provide a horizontal machining center having a tool magazine for storing all of tools used for machining five sides of a workpiece so that the tools can be shared by both vertical and horizontal tool spindles.

Briefly, in a machine tool according to the present invention, a vertical head, which rotatably carries a vertical tool spindle and a horizontal drive shaft drivingly connected therewith, is removably supported on a vertical head support. In advance of a machining operation on a top surface of a workpiece, relative movement between the spindle head and the vertical head support are effected in a vertical direction and first and second horizontal directions perpendicular with each other, so that the vertical head is mounted on the spindle head, with the horizontal drive shaft being drivingly connected with a horizontal tool spindle rotatably carried in the spindle head.

The machine tool is further provided with a tool support station for vertically supporting at least one tool. The spindle head is moved relative to the tool support station in the vertical direction and the first and second directions and enables the vertical tool spindle of the vertical head being mounted thereon to receive a tool from, and return it to the tool support station. A tool transfer device is further provided between the tool support station and a tool changer, which is operable to transfer tools between a tool magazine and the horizontal tool spindle. The tool transfer device receives a tool taken out by the tool changer from the tool magazine and transfers the tool to the tool support station. Further, the tool transfer device receives from the tool support station another tool which has been returned from the vertical head being mounted on the spindle head, and hands over the tool to the tool changer.

With this configuration, tools stored in the tool magazine can be used not only on the horizontal tool spindle of the spindle head, but also on the vertical tool spindle of the vertical head being mounted on the spindle head. This advantageously results in effective use of the tools. Furthermore, in tool transfer between the tool magazine and the vertical head being mounted on the spindle head, the tool changer only serves to take out tools from the tool magazine for handing-over to the tool transfer device and receive tools from the tool transfer device for storage in the tool magazine. Accordingly, it is possible for the tool changer to take the same construction as conventional tool changers. More advantageously, the provision of the vertical head, the tool support station and the tool transfer device makes it possible to provide a known horizontal machining center with the function of a vertical machining center without substantial modification in the construction of the horizontal machining center.

BRIEF DESCRIPTION OF THE ACCOMPANYING DRAWINGS

The foregoing and other objects and many of attendant advantages of the present invention will be readily appreciated as the same becomes better understood by reference to the following detailed description of preferred embodiments when considered in connection with the accompanying drawings, wherein like reference numerals designate indentical or corresponding parts throughout the several views, and in which.

DETAILED DESCRIPTION OF THE PREFERRED EMBODIMENTS

Figure 1:
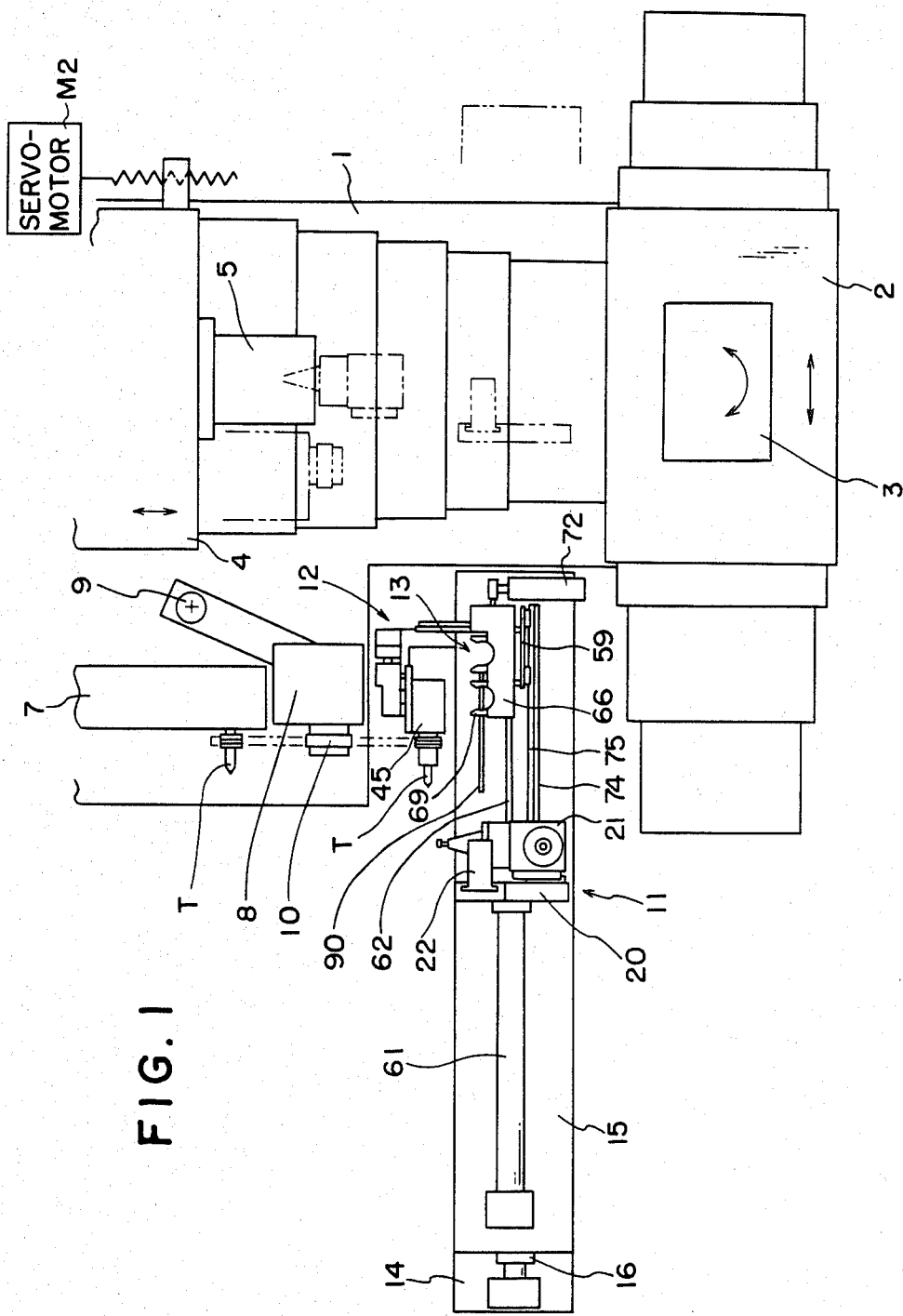
FIG. 1 is a plan view of a horizontal machining center according to the present invention.
Figure 2:
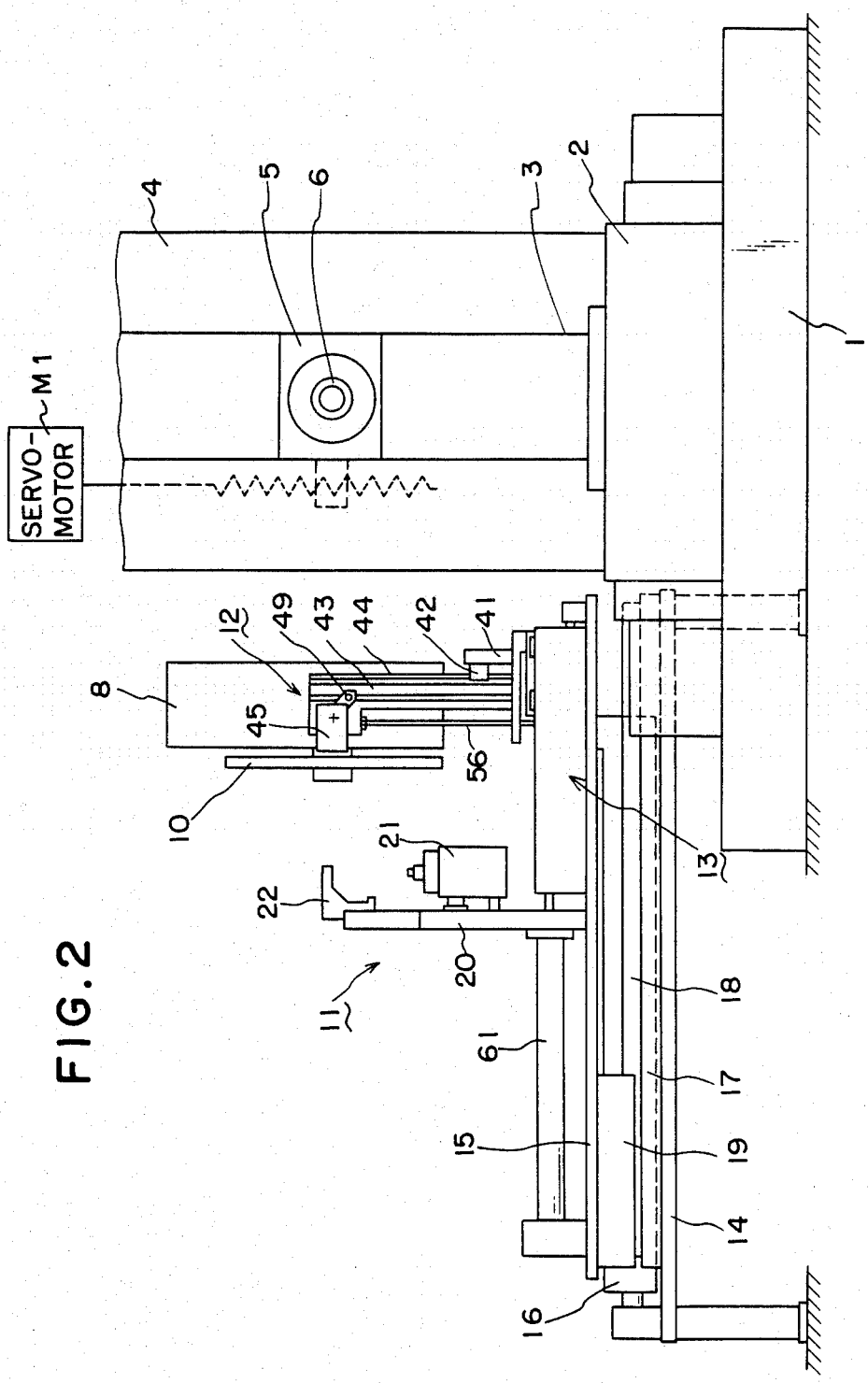
FIG. 2 is a front view of the horizontal machining center.

As shown in FIGS. 1 and 2, a work table 2 is slidably mounted on a bed 1 for lateral sliding movement as shown. A rotary table 3 is angularly movably mounted on the work table 2. A column 4 is installed on the bed 1 for movement toward and away from the work table 2. The column 4 has a vertically movable spindle head 5, in which a horizontal tool spindle 6 is rotatably mounted. A tool magazine 7 is disposed on the bed 1 alongside of the column 4 and stores a plurality of tools T which can be mounted on the tool spindle 6 of the spindle head 5 and also can be mounted on a vertical head 21 (described later) for machining an upper side of a workpiece. A carrier 8 serves as a tool changer to transfer and change tools T between the tool magazine 7 and the horizontal tool spindle 6 of the spindle head 5. The carrier 8 is angularly movable about a vertical shaft 9 between the tool magazine 7 and the horizontal tool spindle 6 and supports a tool change arm 10 to be pivotable about a horizontal shaft, not shown. The foregoing structure is known from existing horizontal machining centers. According to the present invention, a vertical head support 11, a tool transfer device 12, and a tool support station 13 are further incorporated in the known horizontal machining center without substantial modification thereof. The vertical head support 11, the tool transfer device 12, and the tool support station 13 are operable independently and cooperate with one another for making the tools T in the tool magazine 7 available in performing machining operations on the upper side of the workpiece.

These additional machine components will now be described in detail.

A base 14 is placed on the floor laterally of the bed 1. A pair of rails 18 (FIG. 5) are mounted on rail supports 17 and extend perpendicularly to the axis of the horizontal tool spindle 6. A transfer table 15 is movably disposed on the rails 18 through linear ball bearings 19. The transfer table 15 can travel along the rails 18 under the control of a cylinder actuator 16.

Figure 3:
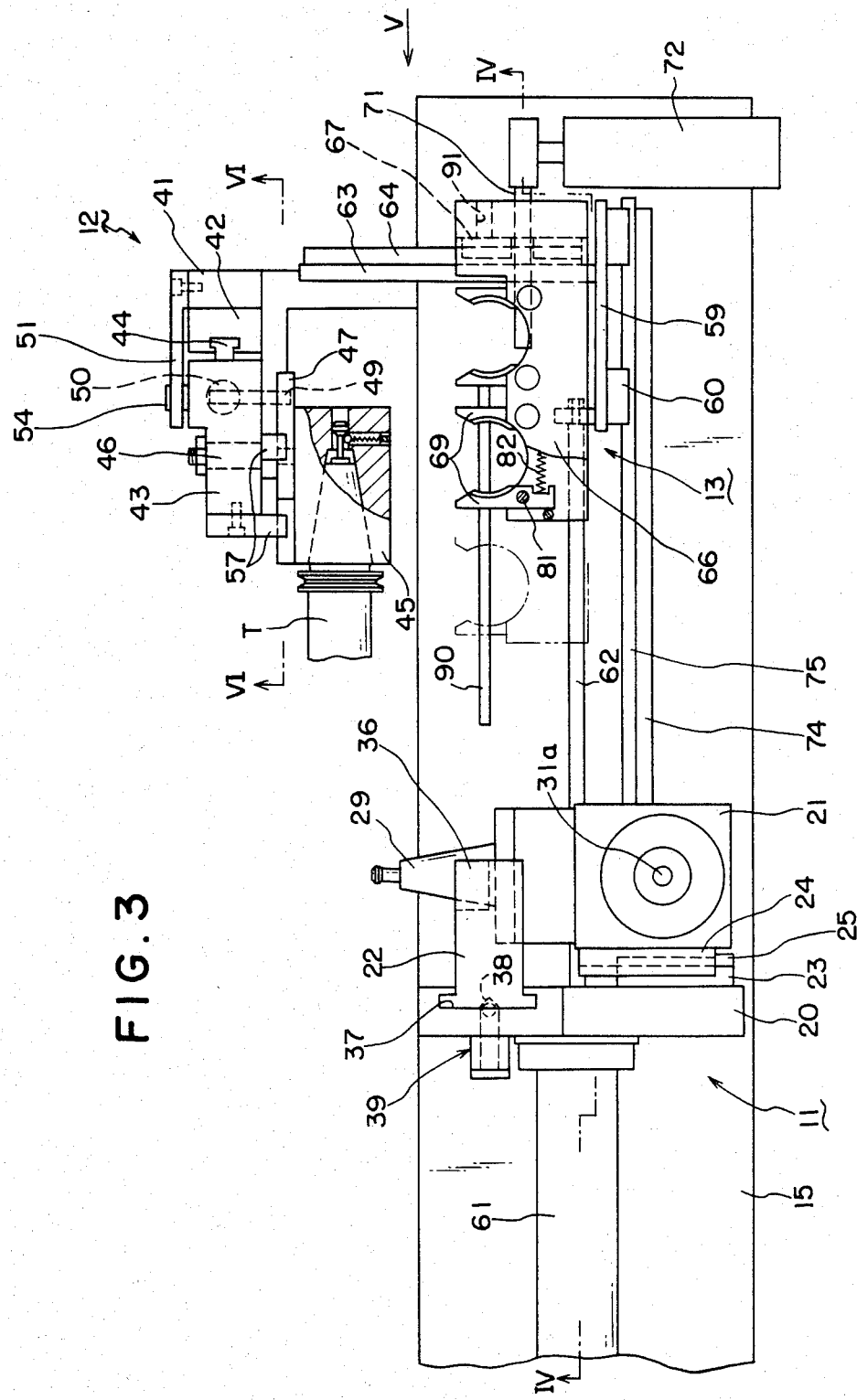
FIG. 3 is an enlarged fragmentary plan view of a part of the horizontal machining center.
Figure 4:
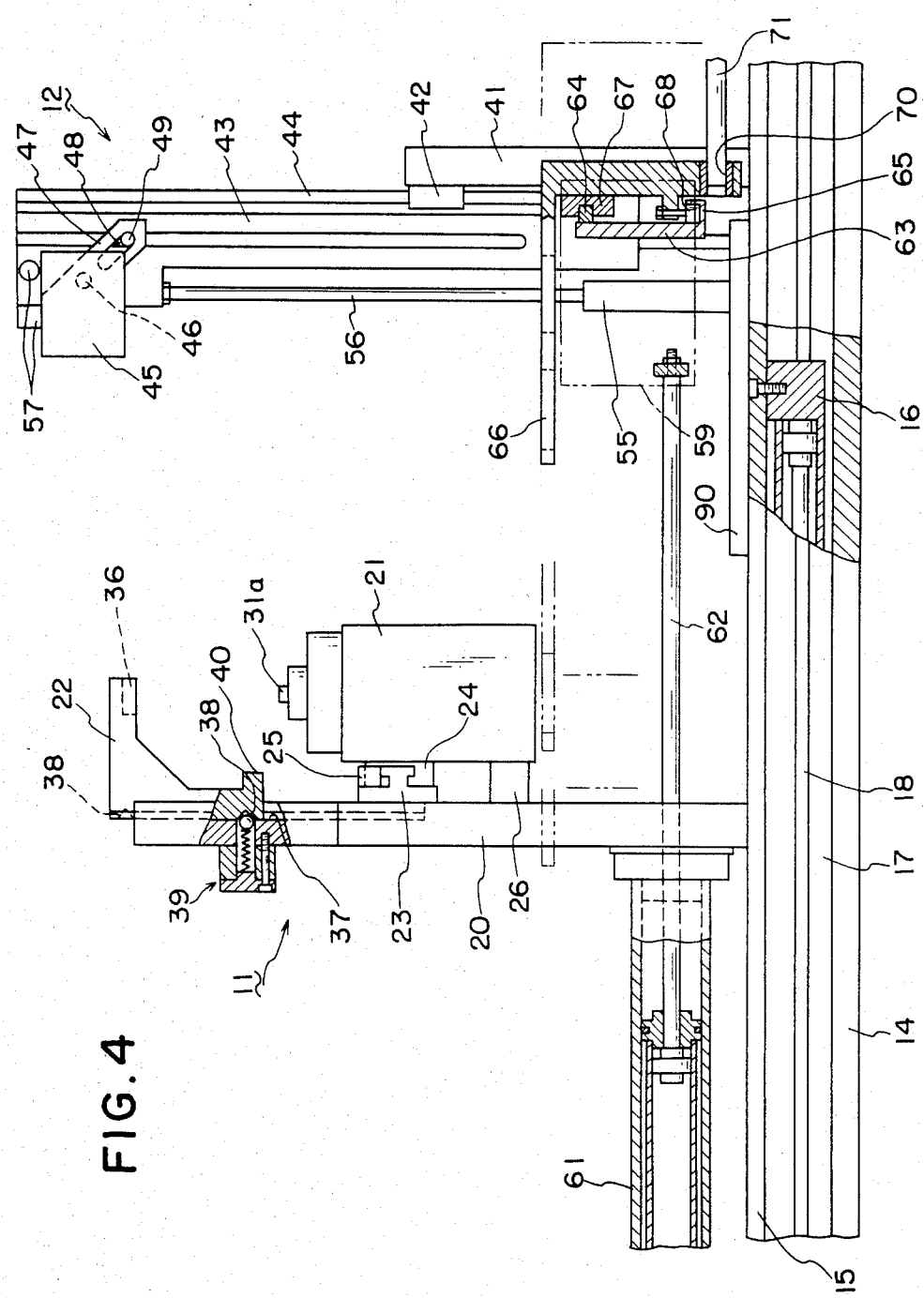
FIG. 4 is a cross-sectional view taken along line IV—IV of FIG. 3.
Figure 6:
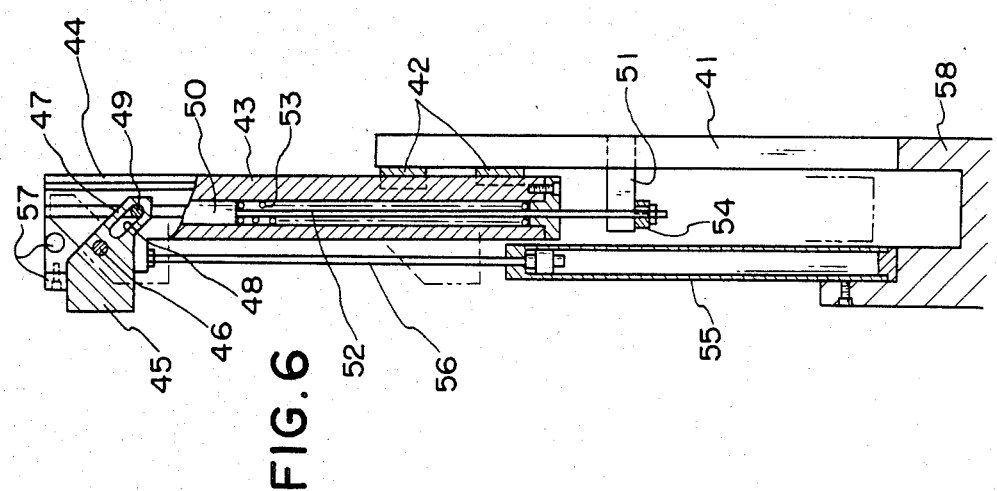
FIG. 6 is a cross-sectional view taken along line VI—VI of FIG. 3.
Figure 5:
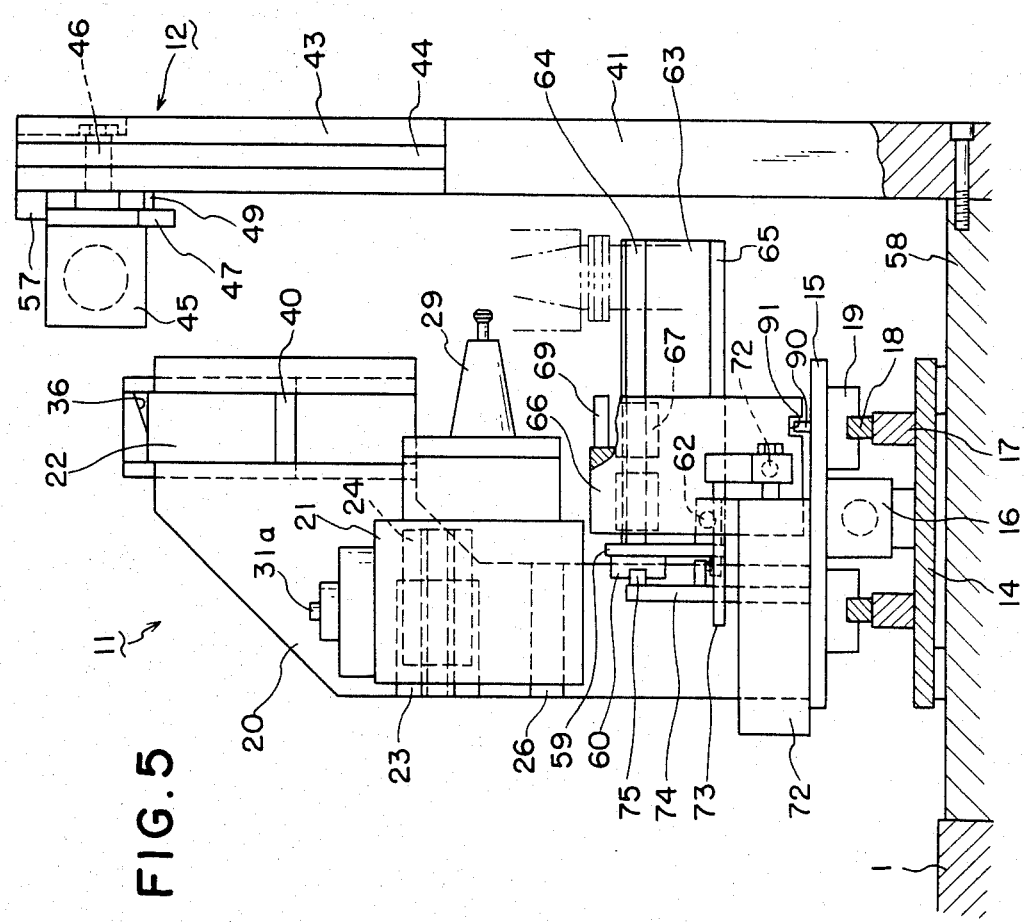
FIG. 5 is a side elevational view, partly in cross section, as seen from the direction indicated by the arrow V of FIG. 3.

The vertical head support 11 is installed on the transfer table 15. As shown in FIGS. 3 through 5, the vertical head support 11 comprises a support body 20 extending vertically upwardly from the transfer table 15, and a T-shaped guide 23 mounted on a lateral surface of the support body 20 which faces the spindle head 5 and extending parallel to the axis of the horizontal tool spindle 6. A vertical head 21 is removably attached to the guide 23 through a T-slot guide 24 thereof. The position in which the vertical head 21 is supported on the guide 23 is limited by a stopper 25. The lateral surface of the support body 20 includes a vertical T-slot guide surface 37 extending from an upper edge of the support body 20 down to the position where the guide 23 is attached. A T-shaped unclamper 22 is vertically slidably guided by the guide surface 37. The unclamper 22 has at its slide surface a pair of upper and lower engagement notches 38, which are engaged one at a time with a spring-biased engagement ball 39 provided in the support body 20. Thus, the unclamper 22 can be located selectively in upper and lower positions. The unclamper 22 also has an engagement projection 40 on a lower end thereof and a slanted surface 36 on an upper end thereof for engaging and pressing a head 31a of a drawing bar 31 (described later) provided in the vertical head 21.

Figure 7:
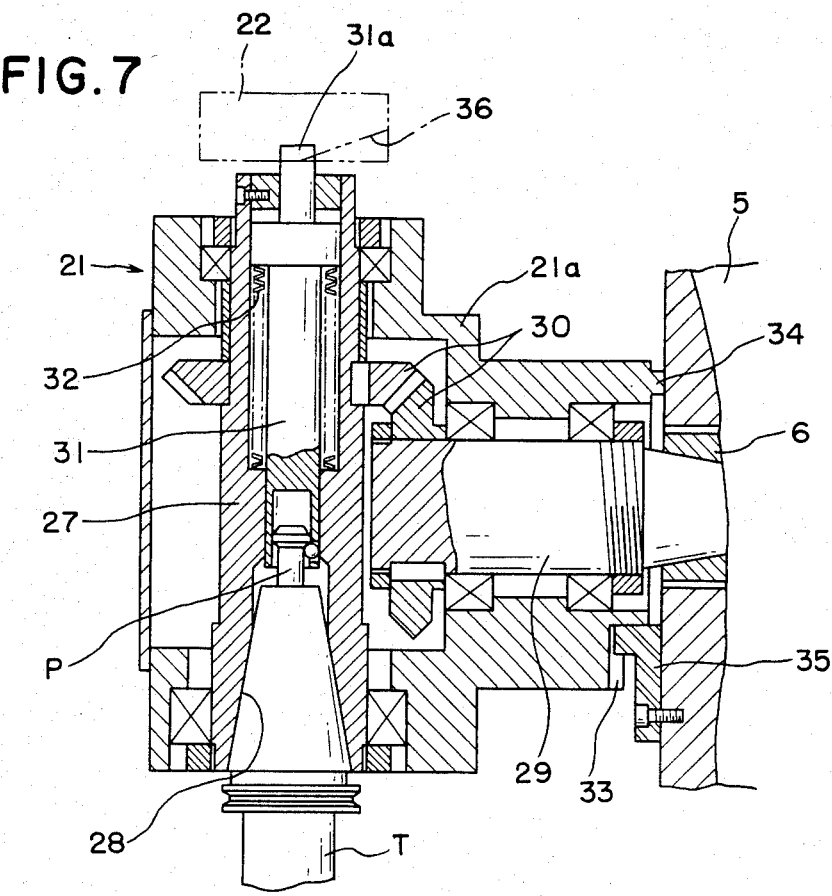
FIG. 7 is a cross-sectional view of a vertical head.
Figure 8:
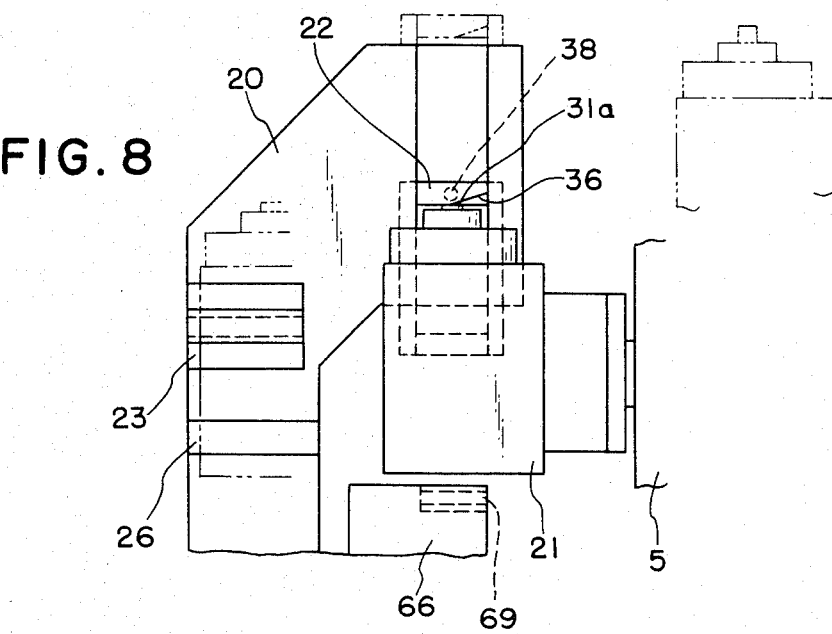
FIG. 8 is a side elevational view explanatory of the manner in which a draw bar in the vertical head is unclamped by a tool unclamper.
Figure 9:
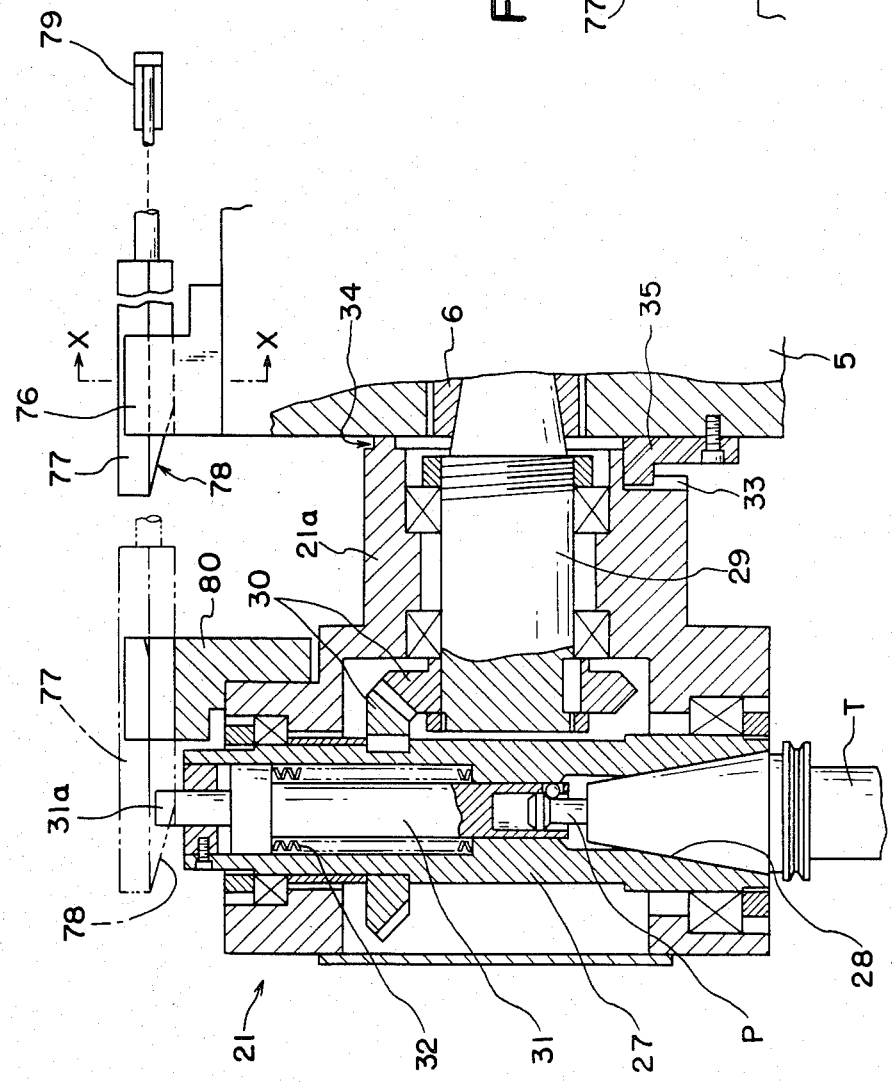
FIG. 9 is the same view as FIG. 7, also illustrating another embodiment of the tool unclamper.
Figure 10:
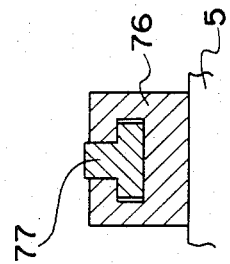
FIG. 10 is a cross-sectional view taken along line X—X of FIG. 9.

As illustrated in FIG. 7, the vertical head 21 includes a vertical head body 21a, in which there is rotatably carried a vertical tool spindle 27 extending perpendicularly to the horizontal tool spindle 6 on the spindle head 5. The vertical head 21 also carries a drive shaft 29, which extends in the same horizontal direction as the horizontal tool spindle 6 for insertion thereinto. The drive shaft 29 and the vertical tool spindle 27 are operatively coupled through intermeshing bevel gears 30. The drive shaft 29, when inserted in a tool receiving hole of the horizontal tool spindle 6, can be driven to rotate in unison with the spindle 6. The vertical tool spingle 27 is formed at its lower end with a tool receiving hole 28 for receiving therein a tool T in vertial axial aligment therewith. The drawing bar 31 is axially movably received in the vertical tool spindle 27 and engages a pull stud P of the tool T inserted in the tool receiving hole 28 for clamping and unclamping the tool T. The drawing bar 31 is normally urged by disc springs 32 in a direction to clamp the tool T. The head 31a of the drawing bar 31 projects out of an upper end of the vertical tool spindle 27. The vertical head body 21a has at a surface facing the end face of the spindle head 5 an angular positioning groove 33, which is engageable with a phase-setting projection 35 secured to the end face of the spindle head 5. The vertical head body 21a also has an axial positioning projection 34 abuttable against the end face of the spindle head 5 for positioning the vertical head 21 in the axial direction of the horizontal tool spindle 6. In the foregoing embodiment, the unclamper 22 for unclamping the tool T from the vertical tool spindle 27 is mounted on the support body 20. According to another embodiment, as shown in FIGS. 9 and 10, a guide 76 is fixed to an upper surface of the spindle head 5 at its distal end, and a wedge member 77 is guided by the guide 76 and horizontally movable back and forth by a fluid cylinder 79. The wedge member 77 has a lower cam surface 78 at its distal end. When the fluid cylinder 79 is actuated, the wedge member 77 is advanced through a guide 80 fixed to the vertical head body 21a into wedging engagement with the head 31a of the drawing bar 31 to axially lower the latter for unclamping the tool T.

The tool transfer device 12 will be described with reference to FIGS. 3 through 6. The tool transfer device 12 serves to transfer tools T between the tool change arm 10 and the tool support station 13 through vertical displacement and angular displacement of 90°. A vertical support 41 is secured to a bracket 58 extending substantially parallel to the bed 1. The vertical support 41 carries thereon guide members 42, along which a slide bar 43 is guided for vertical movement. The slide bar 43 can be driven for upward and downward movement by a fluid cylinder 55 secured to the blacket 58 and having a piston rod 56 coupled to the slide bar 43.

A tool holder socket 45 is pivotably supported by a shaft 46 on an upper end portion of the slide bar 43 and is angularly movable between horizontal and vertical positions which are limited by a pair of stops 57. The tool holder socket 45 has a projection 47 extending obliquely rearwardly and having a slot 48. A vertically movable rod 50 is guided through the slide bar 43 and has a pin 49 engaging in the slot 48. The rod 50 is urged by a spring 53 upwardly relative to the slide bar 43. A connector rod 52 has an upper end secured to the rod 50 and extends through the spring 53 downwardly beyond a lower end of the slide bar 43. The connector rod 52 has a lower end carrying an abutting member 54, which is abuttable with a stopper 51 projecting laterally from the support 41 for pulling down the rod 50 against the bias of the spring 53 when the slide bar 43 is lifted to its uppermost position, so that the tool holder socket 45 is angularly moved to the horizontal position.

The tool support station 13 will be described with reference to FIGS. 3 through 5. The tool support station 13 serves to transfer tools between the tool transfer device 12 and the vertical head 21.

A rail support plate 74 is disposed on the transfer table 15 and extends between the tool transfer device 12 and the support body 20. A rail 75 is mounted on the rail support plate 74 and extends parallel to the rails 18 guiding the transfer table 15. A holder plate 59 is movably guided by a linear ball bearing 60 on the rail 75 and coupled to a piston rod 62 of a two-stage stroke fluid cylinder 61 secured to a lateral side of the support body 20. To the holder plate 59, there is secured a rail support plate 63 extending perpendicularly to the direction of travel of the holder plate 59 and supporting a rail 64 horizontally therealong. The rail support plate 63 has a guide groove 65 extending horizontally therealong. As illustrated in FIG. 4, a gripper support 66 is movably mounted on the rail support plate 63 by a linear ball bearing 67 riding over the rail 64 and a roller 68 movable along the guide groove 65 for back-and-forth movement along the rail support plate 63. The gripper support 66 can be driven to move to and fro by a fluid cylinder 72 having a piston rod, to which is connected a lateral rod 71 fittable in a coupling hole 70 defined in the gripper support 66. The gripper support 66 has a slot 91, which receives a guide rail 90 fixedly mounted on the transfer table 15 for preventing the gripper support 66 from moving back and forth while the gripper support 66 is moved by the fluid cylinder 61 toward the support body 20.

As best shown in FIG. 3, at least two pairs of tool gripping jaws 69 are pivotably mounted by pins 81 in an upper portion of the gripper support 66. The tool gripping jaws 69 in each pair are normally biased by a spring 82 acting therebetween in a direction to close their gripping ends.

Operation of the horizontal machining center as constructed above is as follows: For changing tools between the tool magazine 7 and the spindle head 5, the carrier 8 and the tool change arm 10 are horizontally angularly moved in the manner well known to effect tool changing between the tool magazine 7 and the spindle head 5.

When tools T are to be transferred between the tool magazine 7 and the tool transfer device 12, the fluid cylinder 55 is actuated to lift the slide bar 43 up to its uppermost position. The upward movement of the slide bar 43 causes the abutting member 54 to engage the stopper 51 for moving the rod 50 relative to the slide bar 43 against the resilient force of the spring 53 until the socket 45 is swung to the horizontal position. Then, the tool change arm 10 is turned through 90° from the vertical to the horizontal position to grip a tool T in the tool magazine 7. Where the socket 45 already holds a tool T which is to be returned to the tool magazine 7, the tool change arm 10 also grips this tool T. The tool change arm 10 is advanced along the axis of rotation thereof to pull the tool T out of the tool magazine 7 and also pull the tool T, if any, out of the socket 45. The tool change arm 10 is then angularly moved through 180° and is retracted along the axis of rotation thereof to insert the new tool T into the socket 45 and store the previous tool T, if any, back into the tool magazine 7. The tool changing operation is completed after the tool change arm 10 is then swung back through 90°.

To effect tool changing between the tool transfer device 12 and the tool support station 13, the slide bar 43 is lowered to its lowermost position by the fluid cylinder 55. When the slide bar 43 is lowered, the abutting member 54 remains engaged with the stopper 51 and the rod 50 at rest moving relative to the slide bar 43 until the compressed spring 53 is fully extended. The pin 49 pushes up the projection 47 to cause the socket 45 to turn counterclockwise (FIGS. 4 and 6) about the shaft 46 through 90° into the vertical position. The tool T inserted in the socket 45 is thus directed downwardly.

Actuation of the cylinder 72 moves the gripper support 66 toward the tool transfer device 12 for gripping the tool T in the socket 45 in the lowermost position with one of the pairs of tool gripping jaws 69. Thereafter, the slide bar 43 is moved upwardly to the uppermost position. The tool T is thus transferred from the socket 45 to the tool gripping jaws 69. The two-stage stroke fluid cylinder 61 is actuated for a shorter stroke to shift the holder plate 59 until the other pair of tool gripping jaws 69 are vertically aligned with the socket 45. The slide bar 43 is lowered again and a tool T gripped by the other pair of tool gripping jaws 69 is inserted into the lowered socket 45. The slide bar 43 is elevated again to the uppermost position after the fluid cylinder 72 is actuated to retract the gripper support 66 for moving back the tool gripping jaws 69.

When the vertical head 21 is to be mounted on the spindle head 5, the fluid cylinder 16 is activated to move the transfer table 15 to the right as viewed in FIGS. 1 and 2 for positioning in front of the spindle head 5 the vertical head 21 being carried by the support body 20. Then, the spindle head 5 is vertically moved to bring the horizontal tool spindle 6 into axial alignment with the drive shaft 29 of the vertical head 21. The column 4 and hence, the spindle head 5 is advanced to insert the drive shaft 29 into the horizontal tool spindle 6, and the drive shaft 29 and the horizontal tool spindle 6 are connected together by a clamp (not shown) in the spindle 6. Subsequently, the column 4 is retracted to pull the vertical head 21 off the T-shaped guide 23 on the support body 20, whereby the vertical head 21 is mounted on the spindle head 5. The vertical movement of the spindle head 5 and the movement of the column 4 are effected by the operation of servomotors M1 and M2, which are respectively connected to the spindle head 5 and the column 4 via feed screws.

To change tools with respect to the vertical head 21 being mounted on the spindle head 5, the drawing bar 31 in the vertical head 21 must be lowered to the unclamping position. This can be done by vertically moving the spindle head 5 to a position where the slot of the T-slot guide 24 of the vertical head 21 comes into an engageable relation with the engagement projection 40 of the unclamper 22, and then, by advancing the spindle head 5 to fit the engagement projection 40 in the slot of the T-slot guide 24 of the vertical head 21. Advance movement of the spindle head 5 brings the head 31a of the drawing bar 31 into abutting engagement with the slanted surface 36 on the unclamper 22. Continued advance movement of the spindle head 5 causes the slanted surface 36 to depress the drawing bar 31 to the unclamping position.

In the unclamping device as shown in FIGS. 9 and 10, alternatively, the fluid cylinder 79 is actuated to advance the wedge member 77, so that the cam surface 78 is brought into abutting engagement with the head 31a of the drawing bar 31, which is thus lowered to the unclamping position.

The two-stage stroke fluid cylinder 61 is activated again for a longer stroke to displace the gripper support 66 so as to position the tool T gripped by one pair of the tool gripping jaws 69 immediately below the vertical head 21 being mounted on the spindle head 5. Thereafter, the spindle head 5 is lowered to allow the tool T held by the tool gripping jaws 69 to be inserted into the tool receiving hole 28 of the vertical tool spindle 27. When the spindle head 5 is lowered with the drawing bar 31 being held in the unclamping position by the unclamper 22, the latter is also downwardly moved along with the downward movement of the spindle head 5. In the case where the drawing bar 31 is unclamped by the wedge member 77, the drawing bar 31 is kept at its lowered position while the spindle head 5 is downwardly moved, since the wedge member 77 is mounted on the spindle head 5.

After the tool T is inserted into the tool receiving hole 28 of the vertical tool spindle 27, the spindle head 5 is retracted to horizontally pull the tool T out of the tool gripping jaws 69. When the spindle head 5 is retracted, the vertical head 21 is disengaged from the unclamper 22 to release the head 31a of the draw bar 31 out of abutting angagement with the slanted surface 36. The drawing bar 31 is now forced to clamp the tool T under the resiliency of the disc springs 32. The unclamper 22 is maintained by the engagement ball 39 engaging in the upper engagement notch 38 to stay in its lowered position.

In the embodiment of FIGS. 9 and 10 the wedge member 77 is retracted to the initial position to allow the drawing bar 31 to clamp the tool, and then the spindle head 5 is withdrawn to disengage the vertical head 21 from the unclamper 22.

When the vertical head 21 is to be returned from the spindle head 5 to the support body 20, the foregoing mounting process should be reversed.

Although certain preferred embodiments have been shown and described, it should be understood that many changes and modifications may be made therein without departing from the scope of the appended claims.

What is claimed is:

1. A machine tool with a tool change function, comprising:
    a tool magazine for removably storing a plurality of tools;
    a spindle head for rotatably carrying a horizontal tool spindle and having a tool receiving hole for removably receiving said tools one at a time;
    a tool changer provided between said tool magazine and said horizontal tool spindle of said spindle head for transferring said tools therefrom;
    a single vertical head rotatably supporting a vertical tool spindle and a horizontal drive shaft drivingly connected with said vertical tool spindle and adapted to be removably mounted on said spindle head, said horizontal drive shaft being drivingly connected with said horizontal tool spindle and said vertical tool spindle also having a tool receiving hole for removably receiving said tools one at a time;
    a vertical head support for removably supporting said vertical head, said spindle head and said vertical head support being relatively movable in a vertical direction and first and second horizontal directions perpendicular to each other;
    first and second feed means for effecting relative movement between said spindle head and said vertical head support respectively in said vertical direction and said first horizontal direction so as to bring said horizontal drive shaft of said vertical head into axial alignment with said horizontal tool spindle;
    third feed means for effecting relative movement between said spindle head and said vertical head support in said second horizontal direction so as to mount said vertical head on said spindle head, said horizontal drive shaft being drivingly connected with said horizontal tool spindle;
    a tool support station for vertically supporting said tools at least one at a time so as to enable said vertical tool spindle of said vertical head being mounted on said spindle head to receive and remove any one of said tools from said tool support station; and
    a tool transfer device provided between said tool changer and said tool support station for transferring said tools therebetween such that each tool transferred from said tool changer to said tool support station is vertically held at said tool support station for subsequent insertion into said vertical tool spindle of said vertical head.

2. A machine tool as set forth in claim 1, wherein said tool transfer device includes:
    a vertically movable socket carrier;
    a tool socket carried by said socket carrier for pivotable movement between a horizontal position and a vertical position;
    carrier feed means connected with said socket carrier for vertically moving said socket carrier between an upper position and a lower position; and
    pivot control means connected with said tool socket for holding said tool socket in said horizontal position when said socket carrier is in said upper position, so as to permit said tool changer to insert one of said tools into, and remove the same from, said tool socket and for holding said tool socket in said vertical position when said socket carrier is in said lower position, so as to permit handing-over of one of said tools between said tool socket and said tool support station.

3. A machine tool as set forth in claim 2, wherein said tool support station includes:
    at least two sets of tool grippers for simultaneously supporting any two of said tools; and
    gripper feed means for effecting relative movement between said at least two sets of said tool grippers and said tool socket held in said vertical position so as to selectively bring said at least two sets of said tool grippers into axial alignment with said tool socket held in said vertical position.

4. A machine tool as set forth in claim 2, wherein said pivot control means includes:
    an operating rod slidably received in said socket carrier for relative movement in said vertical direction and engaged with said tool socket at one end thereof for pivotally moving said tool socket when moved relative to said socket carrier in said vertical direction;
    a spring interposed between said socket carrier and said operating rod for urging said operating rod toward one of upper and lower directions;

a movable stop secured to the other end of said operating rod;

a first stationary stop fixedly provided and abuttable with said movable stop for moving said operating rod relative to said socket carrier against said spring so as to pivotally move said tool socket to said horizontal position when said carrier support is moved by said carrier feed means to said upper position; and a second stationary stop fixedly provided and engageable with said tool socket for holding the same in said vertical position when said carrier support is moved by said carrier feed means to said lower position.

5. A machine tool as set forth in claim 1, wherein said vertical head includes a sping-biased drawing bar for clamping any one of said tools being received in said vertical tool spindle, further comprising:

a tool unclamper provided outside of said vertical head and engageable with one end of said drawing bar at least while said vertical tool spindle of said vertical head being mounted on said spindle head receives in said tool receiving hole thereof one of said tools being still supported by said tool support station, for moving said drawing bar to unclamp said one of said tools from said vertical tool spindle.

6. A machine tool as set forth in claim 5, further comprising:

means for guiding said tool unclamper on said vertical head support for vertical movement thereon and said unclamper being formed with upper and lower horizontal surfaces vertically spaced for simultaneously engaging said one end of said drawing bar and a main body of said vertical head, said upper horizontal surface being formed with a slant surface extending in said second horizontal direction for moving said drawing bar along said slant surface when said vertical head being mounted on said spindle head is moved relative to said vertical head support in said second horizontal direction for engagement with said tool unclamper.

7. A machine tool as set forth in claim 6, wherein said tool support station includes:

a first gripper support guided on said vertical head support for movement in said first horizontal direction;

a second gripper support guided on said first gripper support for movement in said second horizontal direction;

at least two sets of tool grippers carried by said second gripper support and spaced in said first horizontal direction;

a first actuator for moving said second gripper support in said second horizontal direction to cause one of said at least two sets of said tool grippers to grip one of said tools presented by said tool transfer device; and a second actuator connected with said first gripper support for moving the same in said first horizontal direction so as to selectively bring said at least two sets of said tool grippers into axial alignment with said vertical tool spindle when said vertical head being mounted on said spindle head is in engagement with said tool unclamper vertically movable on said vertical head support.

8. A machine tool as set forth in claim 7, wherein:

said vertical head support is movable in said first horizontal direction for presenting said vertical head in front of said spindle head; and said second feed means is connected with said vertical head support for moving the same in said first horizontal direction.

9. A machine tool as set forth in claim 7, further comprising:

a movement restraining member provided between said vertical head support and said second gripper support for permitting movement of said second gripper support relative to said first gripper support in said second horizontal direction only when said first gripper support is at one end of movement thereof in said first horizontal direction.

10. A machine tool as set forth in claim 9, wherein said first actuator is mounted on said vertical head support, further comprising:

a connection member movable by said first actuator in said second horizontal direction and engageable with said second gripper support only when said first gripper support reaches said one end of movement thereof in said first horizontal direction, for moving said second gripper support in said second horizontal direction.

* * * * *